Dec. 8, 1959  D. WESTON ET AL  2,916,215
AIR SYSTEMS FOR DRY MATERIAL REDUCTION
MILLS AND CONTROLS THEREFOR
Filed Sept. 10, 1956  6 Sheets-Sheet 1
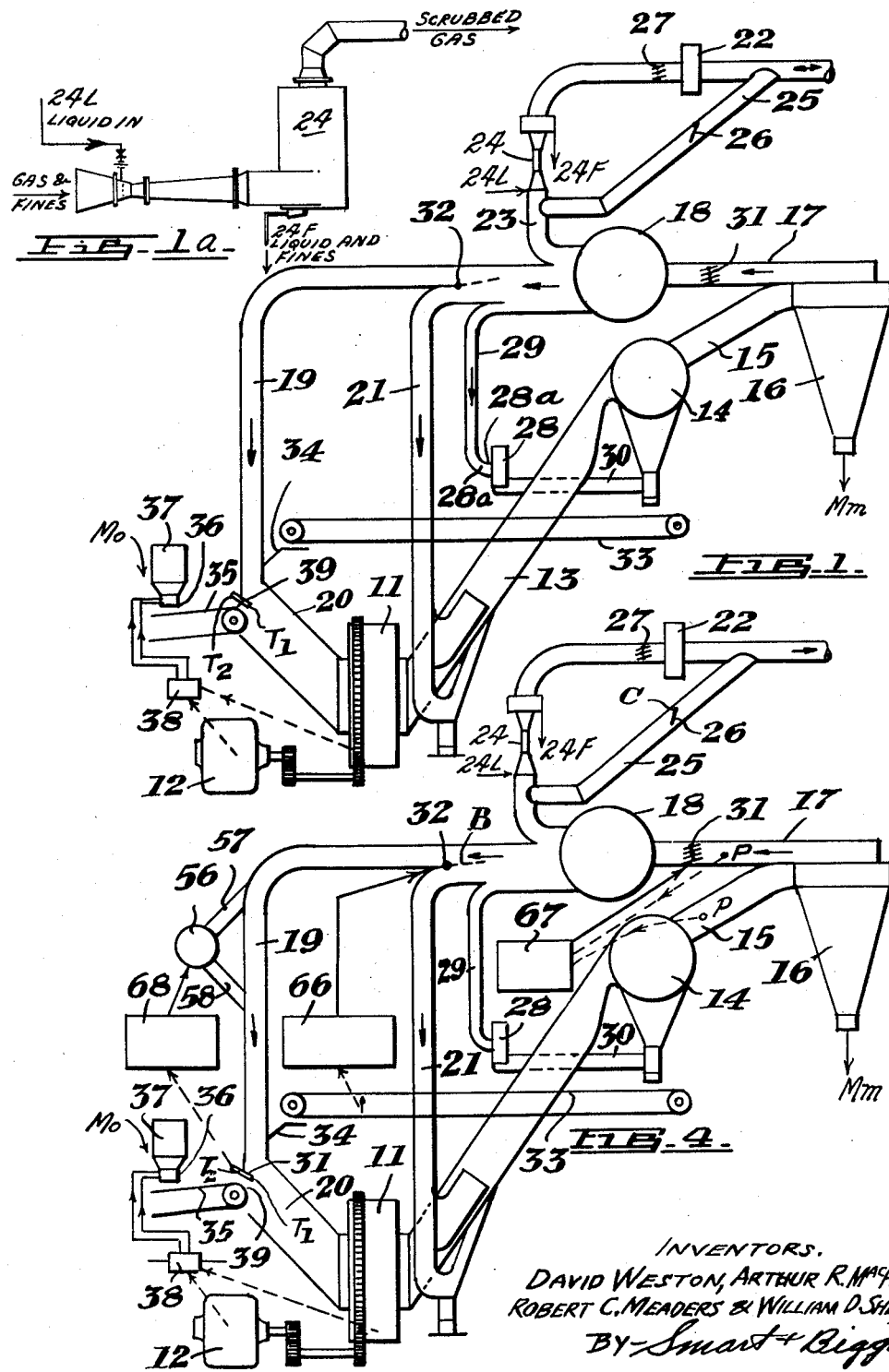
INVENTORS.
DAVID WESTON, ARTHUR R. MACPHERSON,
ROBERT C. MEADERS & WILLIAM D. SHELDON.
BY Smart + Biggar
ATTORNEYS.

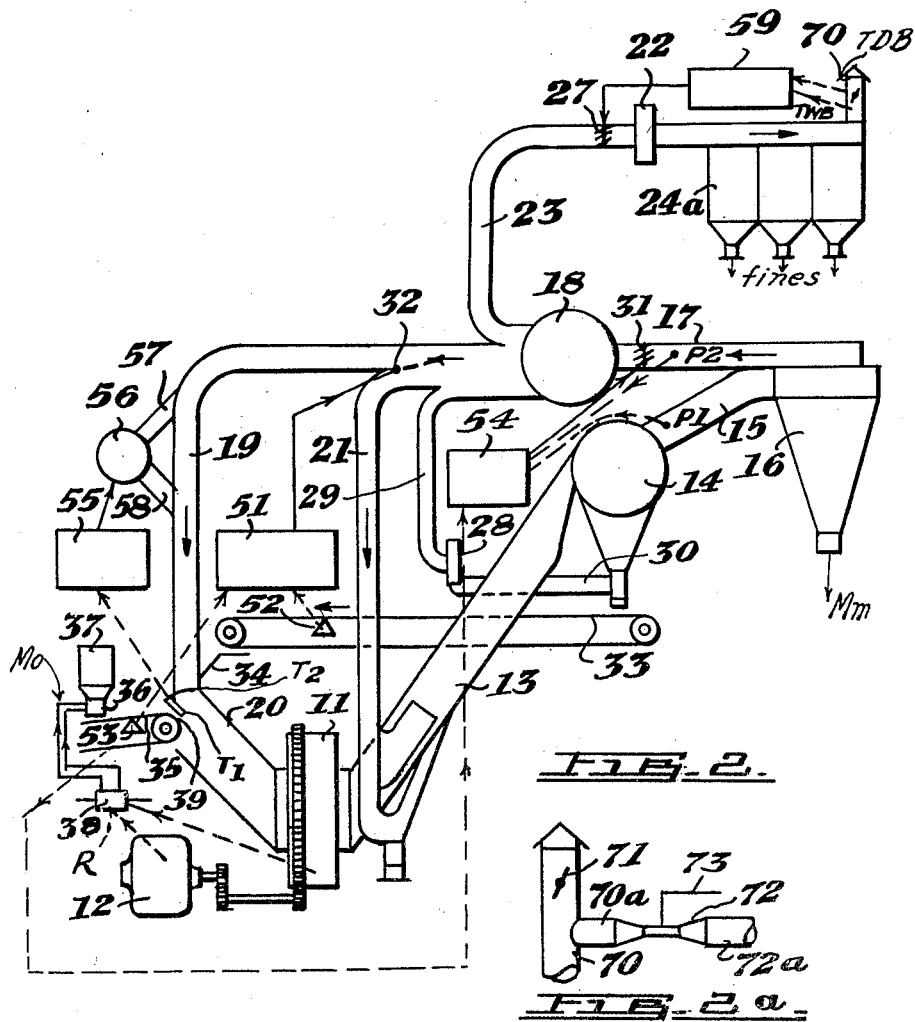

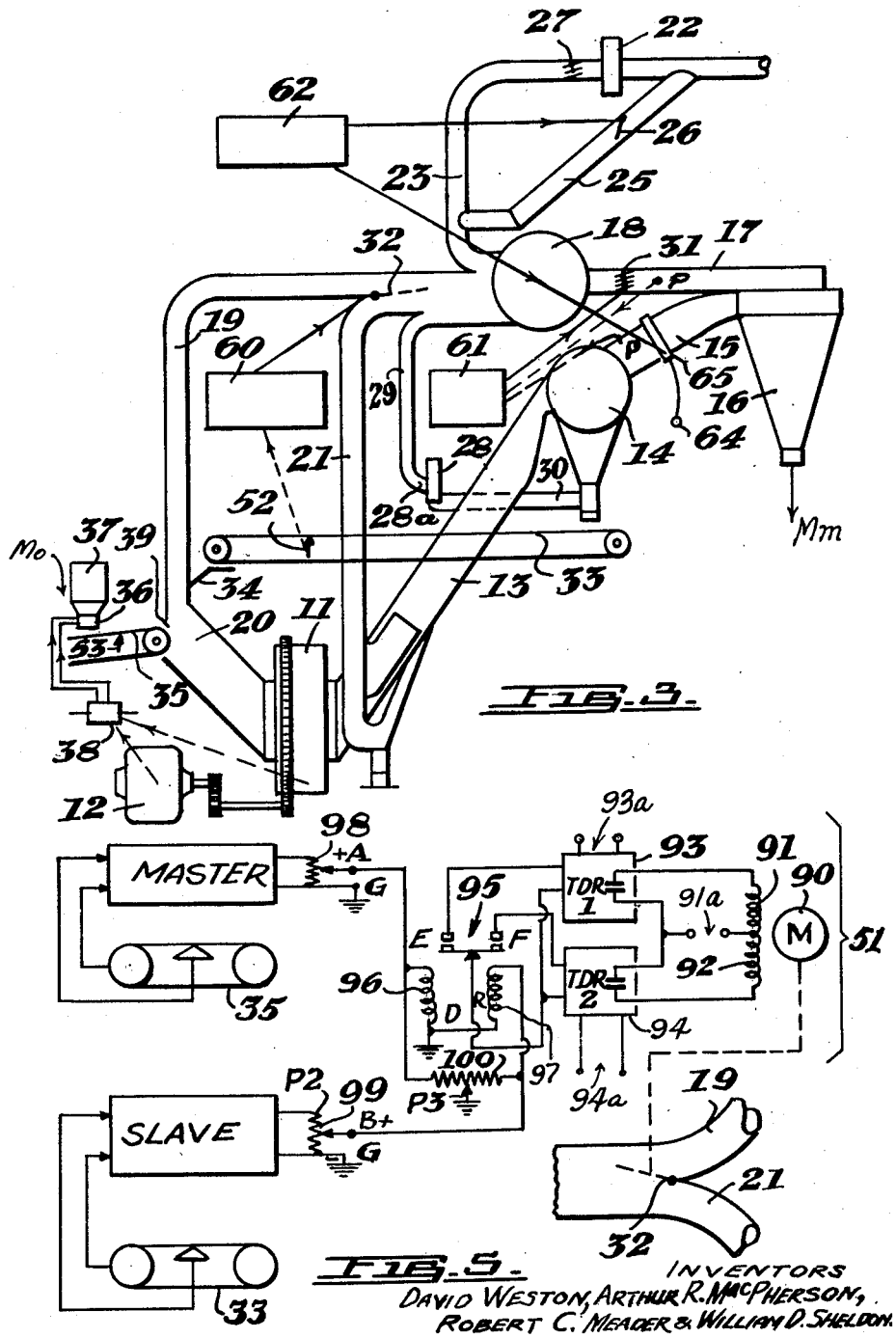

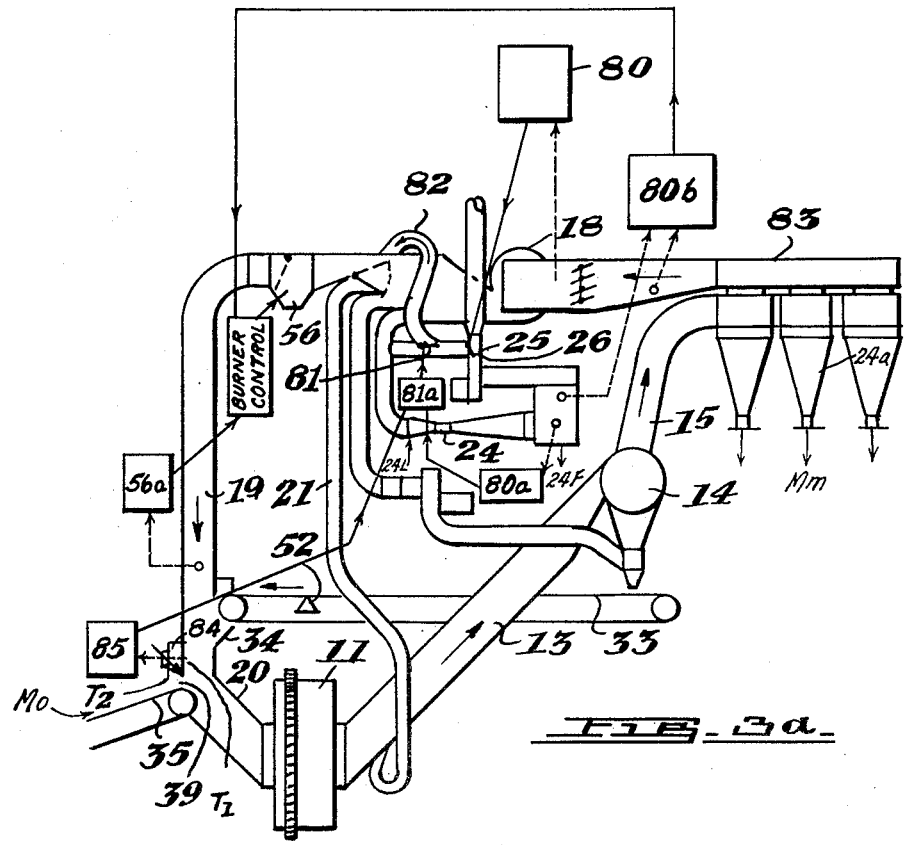

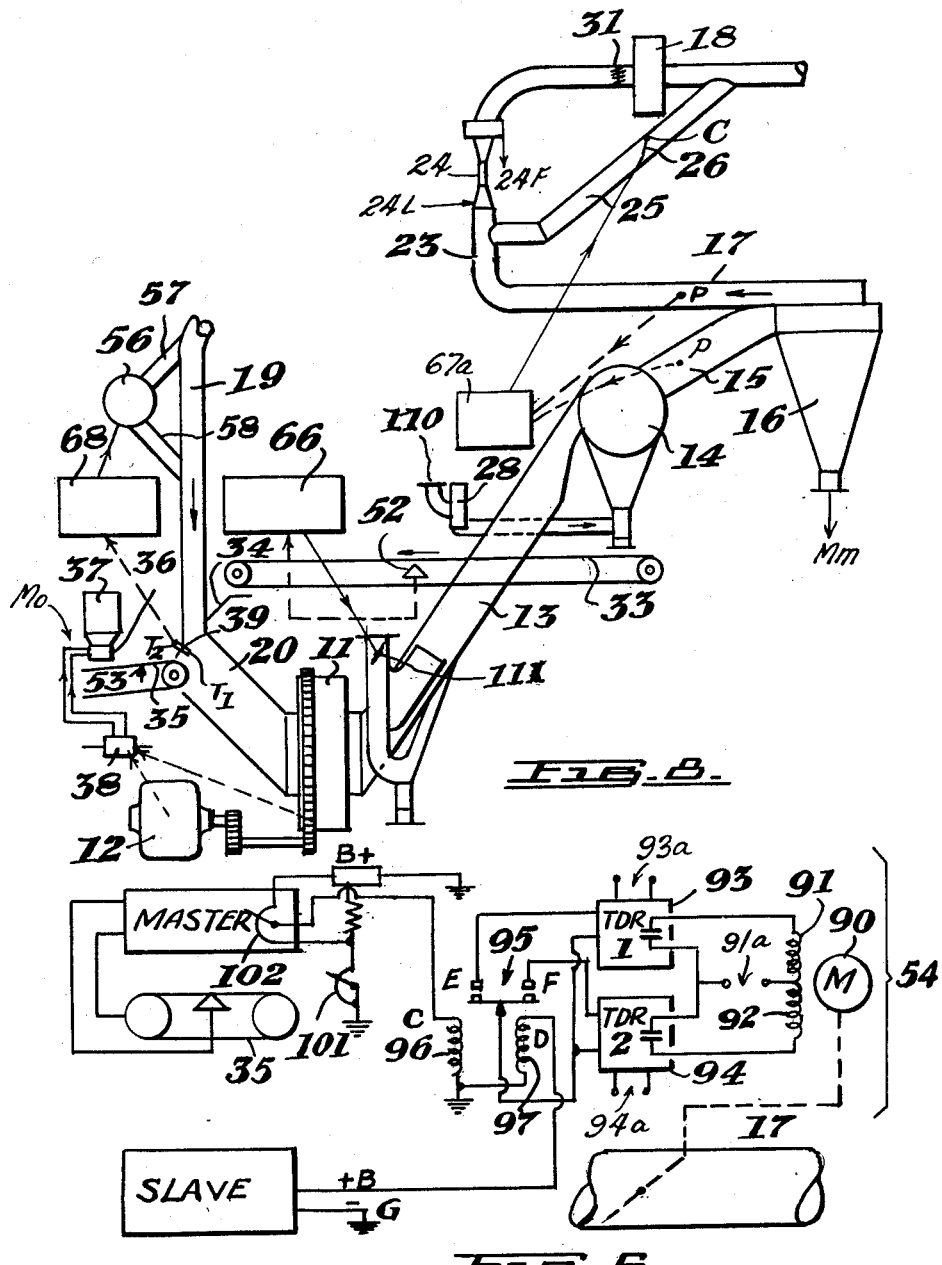

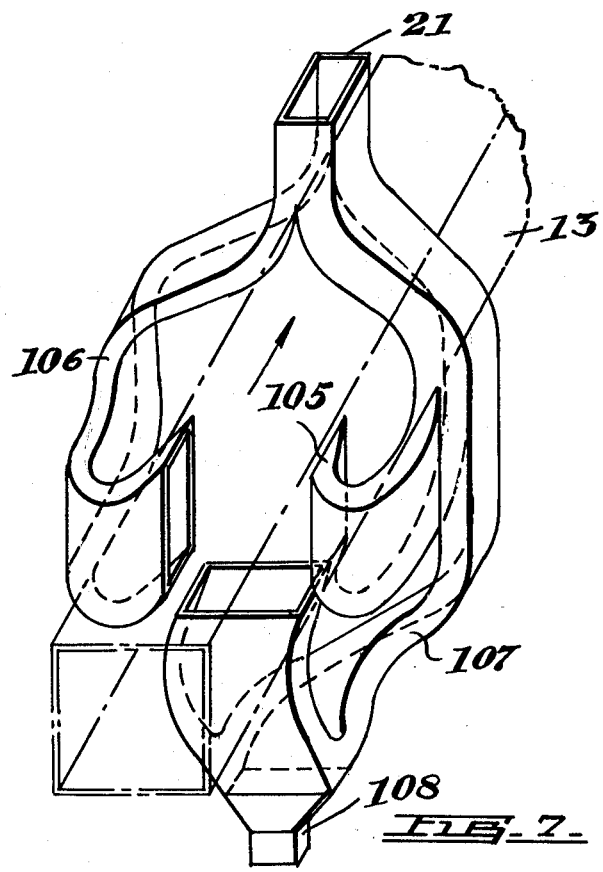

United States Patent Office 2,916,215
Patented Dec. 8, 1959

2,916,215

AIR SYSTEMS FOR DRY MATERIAL REDUCTION MILLS AND CONTROLS THEREFOR

David Weston and Arthur R. MacPherson, Toronto, Ontario, Canada, Robert C. Meaders, Columbus, Ohio, and William D. Sheldon, Galt, Ontario, Canada Application September 10, 1956, Serial No. 608,728

35 Claims. (Cl. 241—19)

This invention relates to the operation of dry crushing and/or grinding mills and more particularly it relates to an air system for such mills and to methods and apparatus for the automatic control of the air in such air system.

In copending applications Serial Nos. 282,505 (now Patent No. 2,766,939), 432,200 and 426,721 (now Patent No. 2,276,941), there is described a method and means whereby the milling conditions within such mills can be maintained constant at a desired operating point with a view either to obtaining maximum reduction capacity or to maintain a predetermined size distribution in the mill product. The possibility of maintaining constant milling conditions at any one of a number of desired operating points has made possible an extensive study of the characteristics and control of the air system associated with such mills which provides the air stream which is used to remove the product from the mill. Such study has indicated that considerable increases in production and freedom from operating difficulties can be obtained by proper control of the air in the air system.

The air or other gaseous medium circulated through a dry crushing and/or grinding mill for instance in a closed air system such as that described in Patent No. 2,674,413 of April 6, 1954, or in an open circuit such as that described in Patent No. 2,555,171 of May 29, 1951, may be regarded as having three distinct and separate variable characteristics in respect to its effect upon the milling operation:

(a) Its ability to remove from the mill particles of material which have been reduced below a certain size-weight surface area factor. This characteristic will hereinafter be referred to for convenience as the "velocity factor" since it depends primarily upon the velocity of the airstream through the mill.

(b) The capacity to maintain mill product in suspension, which will be referred to hereinafter as "carrying power."

(c) The ability to absorb or deposit moisture or other matter, which depends primarily on temperature, pressure, and saturation, and which will be referred to herein as "condition."

In order to enable a dry crushing and/or grinding mill to operate efficiently at a predetermined operating point, it is necessary that the velocity factor of the air passing through the mill be high enough to remove the desired product from the mill, that the air have sufficient carrying power to carry away the desired product as quickly as it is removed from the mill, and that the condition of the air be such as not to permit moisture to accumulate, particularly on the finer particles within the mill or air system. Should the rate of production of the mill decline because of a deficiency in any one or more of these factors, the automatic feed control will reduce the rate of feed to the mill and production will be lost.

When a dry crushing and/or grinding mill is operating in a temperate climate where the atmospheric conditions do not change very greatly from day to day or from day to night, it will usually be found that the characteristics of the air being circulated through the mill will not vary to a sufficient extent to have an appreciable effect upon the efficiency of the milling operation. Under these circumstances, the heat introduced to the airstream by the friction within the charge undergoing reduction in the mill and by the friction within the air system is usually sufficient to prevent the circulating air from becoming saturated with moisture, and variations in the ambient temperature and in the temperature of the feed material to the mill are not of sufficient magnitude to seriously alter the carrying power of the air. Where, however, the mill is operating in a climate which is subject to substantial day to night and day to day temperature and humidity variations much mill capacity may be lost through inability of the air to carry away the product from the mill as fast as it is being produced or through moisture build-up in the mill whenever the circulating air becomes too saturated with moisture.

As has been mentioned hereinabove the automatic control means of prior applications Serial Nos. 282,505 (now Patent No. 2,766,939), 432,200 and 426,721 (Patent No. 2,766,941), are adapted to maintain the milling conditions within the mill at a constant value. That is to say the charge volume is maintained substantially constant. Under these conditions, the amount of product produced by the mill will, apart from variations caused by a change in the character of the mill feed, remain generally constant, and it will require a predeterminable amount of air of defined characteristics to remove the product from the mill as fast as it is formed and to carry it away through the air circuit components on the downstream side of the mill. The characteristics of the air, however, are subject to variation from a number of causes, and it is the principal object of this invention to provide a method and automatic means for carrying it into effect whereby the characteristics of the circulated air are controlled in a manner which provides for the efficient removal and carrying away of the mill product regardless of fluctuations in the ambient temperature and humidity, or of fluctuations in the character and condition of the mill feed.

Other objects and advantages of the invention will appear as the description thereof proceeds.

The effective overall control of the air in the air system in accordance with the present invention depends upon adequate and interrelated control of the three factors mentioned above, and the following general description of the method used for controlling each of these factors will serve to indicate the manner in which control is achieved.

*Control of velocity factor*

With the velocity factor of the airstream passing through the mill maintained at a constant value, the maximum size-weight-surface-area factor particles removed from the mill will be substantially constant. With the milling conditions in the mill held constant by means of an automatic feed control as described in prior Patents No. 2,766,939 and No. 2,766,941 the charge volume within the mill will remain substantially constant and the total amount of material withdrawn from the mill by the airstream will depend upon the grindability of the feed material. The particle size distribution in the withdrawn material will depend upon the physical nature of the feed material.

Assuming in the first instance that the grindability of the ore is relatively uniform (which takes into account the majority of cases) the amount of material withdrawn will be substantially constant while the velocity factor of the air through the mill remains constant. For maximum efficiency in the production of a product within a given size range the velocity factor of the air in the mill will be selected so that a certain amount of oversize is extracted from the mill and, if desired, recirculated. With uniform feed material, the amount of oversize will be constant while the velocity factor of the air remains constant.

Changes in atmospheric pressure, and changes in the temperature of the circulated air will, however, cause a change in the velocity factor inasmuch as these changes alter the volumetric delivery of the fan which motivates the airstream. Any alteration in the velocity factor of the air will, however, be made manifest in a decrease or increase of the amount of oversize material. Consequently the velocity factor of the air passing through the mill may be regulated by measuring the rate at which oversize is being produced and adjustnig the delivery of air to the mill in a direction which will compensate for any departure from a predetermined rate of oversize production.

Where the feed material is uniform, effective control may be accomplished merely for instance by measuring the rate of oversize return with an integrating weighometer which produces an electrical signal which can be used to operate relay controlled motors which move a damper which controls the relative amount of air passing through the mill. This damper will be moved in stages in accordance with whether the signal is larger or smaller than a predetermined value which represents ideal conditions. Preferably the system contains a time delay or integration function which provides a sufficiently large time constant in the response of the system so that abrupt changes in the air system are avoided and conditions may reach equilibrium after each change in position of the damper before a new correction can be made. Manual adjustment of the reference point of the system is provided whereby the amount of oversize return is maintained at any desired value.

Should the feed material be non-uniform as to grindability so that substantial variations in the rate of production of the mill occur it may be desirable to maintain the reference point of the return oversize control system at a value which is proportional to the rate of feed to the mill. This may be accomplished by using a signal which is proportional to the rate of feed to the m'll as a reference for the oversize control in a manner which will hereinafter be explained in greater detail.

It will be appreciated that control of the velocity factor can also be accomplished by using a direct measurement of the velocity of the airstream in the return air circuit or a measurement of pressure drop in the return air circuit. It is, however, preferred where the nature of the operation permits to base this control on the rate of production of oversize as this not only compensates for local variations in velocity factor which may occur across a large cross sect'on of airstream in a large mill, but also is more compatible with the overall control system which it is the object of the present invention to provide.

*Control of carrying power*

For efficient operation of the mill it is desirable that all of the material which is removed from the mill and which is of a size-weight-surface area factor which corresponds to the velocity factor of the air passing through the mill, should be transported to the classifier. It will be appreciated of course that some larger material and even an odd grinding ball where these are used will casually enter the discharge duct. These, however, are not intended to be carried by the air and are usually screened out or permitted to fall back into the mill by sliding down the lower side of the duct. Particularly in fine grinding work where the velocity factor of the air passing through the mill is low, this transportation of the material to the classifier w'll normally require more air than is passed through the mill, and it is, therefore, desirable to add air to the air circuit on the downstream side of the mill. In this respect, the amount of air which it is necessary to add is that amount which, taken with the air which passes through the mill, will give a weight of air sufficient for the transportation of the total weight of material to be transported, plus an adequate safety factor. Generally, it is considered that one to five pounds of air will transport one pound of material, but more air is required as the average particle size of the transported material increases because of the lower terminal velocity of the larger particles in the airstream. As the particles to be transported become larger, the carrying capacity of the airstream is also affected by the fact that acceleration of the particles to terminal velocity begins to take an appreciable time. The effect of this is that the average velocity of the particles is materially lower in the portions of duct nearest the mill and the ratio of solids to air in this region is higher than anywhere else in the system. This region is therefore a critical point which determines the carrying power of the system as a whole, for if the air in this region becomes overloaded, the product material will deposit and fall back into the mill.

In order to minimize the above effect, the air which is introduced to the system downstream of the mill is introduced as close as possible to the mill outlet, and is introduced in jets of higher velocity than the main stream of air at the sides and bottom of the main duct. As the heavier particles of product tend to concentrate near the bottom of the duct, the comparatively high velocity of the entering jet at this point will increase the acceleration of these particles and thus reduce the local buildup of high concentrat'ons of solids in the airstream.

The overall carrying power of the air is roughly directly proportional to the mass velocity of the air in the system. This can readily be controlled by maintaining a predetermined pressure drop over a suitable section of the air circuit. To do this, a differential pressure device is suitably connected between the air duct in advance of the classifier and the air duct returning to the main fan and the main fan damper is adjusted to maintain a predetermined pressure differential as will be later described in some detail. Where the feed material is uniform and the total solids carried in the system does not vary materially from time to time, the control may be adjusted manually to provide a constant mass velocity sufficient to handle the production of the mill with a reasonable safety factor.

Where the feed material is non-uniform and substantial variations in the rate of product'on of the mill are to be expected, the reference point of the control may be automatically increased in proportion to increases in the feed rate to the mill, e.g. by using a weight responsive signal derived from a weightometer on the feed belt as will be explained in detail hereinafter.

*Control of air condition*

The important aspects of the air condition within the air circuit are: humidity, temperature, and dust saturation. All these aspects are inter-related.

The efficiency of cyclone collectors for instance is greater when the relative humidity is high than when it is low.

For generally efficient operation, the air passing through the cyclones should have a relative humidity of about 40–80% and the temperature of the airstream should be somewhat above the ambient temperature, but not so much thereabove as to give rise to substantial radiation losses. The bleed-off of air in the return air circuit should be the minimum which will maintain a very slightly sub-atmospheric pressure in the air circuit at the mill inlet, and all this should be achieved without the addition of any heat to the airstream from an outside source. If these conditions prevail, there will be a light dust load in the return air circuit, power consumption in the system will be a minimum, and gr'nding conditions within the mill will not be adversely affected by deposit of moisture.

Naturally such conditions would require ideal atmospheric and feed material conditions, which will never prevail in most locations for more than a very limited time. It is therefore necessary to adjust the functioning of the air system to compensate for changes in temperature and humidity of the atmosphere, and to compensate for the effect of changes in moisture content and changes in temperature of the feed material.

The tendency for dust to buildup in the system will increase when the efficiency of the cyclone collectors becomes lowered due to a lowering in the humidity of the air in the circuit. In prolonged periods of cool weather in extremely dry climates, the minimum bleedoff of air mentioned above may fail to reduce the dust load in the return air circuit to an acceptable value. When this occurs the dust load may be brought down to acceptable values by manually increasing the bleed-off. Alternatively, if water is available, it may be introduced to the system. Either alternative may be made to occur automatically by opening the bleed-off fan damper or introducing moisture to the system responsively to a relative humidity responsive device placed in the air circuit.

A more usual problem is that which occurs in cold and/or wet climates where moisture is carried into the system in association with the mill feed. More than a certain amount of moisture in the mill will substantially reduce the mill capacity, as particles of fines will tend to stick together and to adhere to the mill drum walls. Up to about 2–5% of moisture can be tolerated by the mill without substantial loss of capacity depending upon the fineness of the product produced, and the physical nature of the feed material. If more than the tolerable percentage of moisture is present in the feed, the airstream may be used to evaporate sufficient of the moisture to bring the wet moisture actually within the mill charge down to a value where it does not impair the mill reduction efficiency. In order to do this, however, the air within the air system must be unsaturated as it enters the feed chute of the mill. To an extent governed by the relative humidity and temperature of the ambient air, the moisture in the feed may be evaporated without adding any heat from an outside source inasmuch as the bleed-off air will, when the ambient relative humidity is low, be replaced with unsaturated air, and the heat imparted to the system by the friction in the mill charge and air system will maintain the temperature of the air high enough to prevent the cooling effect of the evaporation and of the feed (if it is cold) from lowering the temperature of the air to a value below the dew point. If, however, there is more moisture in the feed than can, under the conditions of operation, be handled in this manner, the air must be heated in order to maintain efficiency of reduction in the mill.

As will be apparent, the function of the air condition control is primarily to maintain the temperature of the air in the air system above the dew point regardless of variations in the temperature and humidity of the ambient air and regardless of the temperature and moisture content of the mill feed. The dew point may be measured satisfactorily as the wet bulb temperature of the air leaving the system, e.g. in the bleed-off duct. Inasmuch as it is usually convenient to clean the bleed-off air by passing it through a venturi scrubber prior to discharge to the atmosphere, advantage is conveniently taken of the fact that a venturi scrubber is in effect a wet bulb device. The temperature of the saturated air on the discharge side of the venturi reflects with sufficient accuracy for purposes of air condition control, the wet bulb temperature of the air leaving the air system. Minor discrepancies arise depending upon the temperature and volume of the water introduced to the scrubber, but such discrepancies are not normally of sufficient magnitude to prevent the effective use for the purpose of the present invention of the exit temperature of the venturi scrubber as representative of the wet bulb temperature of the air leaving the air system. A further important advantage to be obtained from the use of the venturi scrubber as a wet bulb indicator is that the necessary control can be accomplished without the necessity for complicated measuring devices, all that is necessary being a differential thermostat measuring the temperature differential between the air in the air system on the upstream side of the main fan and the exit temperature of the venturi scrubber.

Where the air system does not include a venturi scrubber, the wet bulb temperature may be measured using a conventional wet bulb device protected from the dust in the system by means of appropriate filters.

The air condition control is designed so that under normal operating conditions a temperature differential between the dry bulb and wet bulb temperatures will be maintained which corresponds to a desired relative humidity in the air system. Under these conditions, the bleed-off will be at a minimum. If the relative humidity within the air system tends to increase due either to introduction of moisture with the ore or a rise in the dew point of the ambient air, the air condition control will cause the bypass damper motor to operate to increase the amount of bleed-off from the air system. If, on the other hand, the dry bulb-wet bulb differential increases indicating a drop in the relative humidity of the air in the air system, the control will operate another damper control which returns saturated air from the venturi scrubber exit side back into the air stream. By this means, the relative humidity of the air within the air circuit may be maintained relatively constant at any desired value over a fairly extensive range of operating conditions.

Where operating conditions are such that control cannot be achieved merely by the adjustment of the bleed-off damper, it is necessary to add heat to the system, e.g. by means of a burner. The burner is controlled by a differential thermostat similarly to the damper control to maintain a predetermined differential between the wet and dry bulb temperatures in the system. As there is a maximum air temperature that can be tolerated within the system having regard to mechanical conditions, an additional thermostat is necessary in the return air duct downstream of the heater to limit the burner output when a predetermined maximum temperature is reached. Using an air conditioning control with a heater in the above manner makes possible the maintenance of a desired condition of the air within the system over an extremely wide range of operating conditions and enables a substantial evaporation of moisture when the feed material is wet. The upper limit of the system is governed only by the amount that the dew point of the air in the system at the maximum permissible operating temperature exceeds the dew point of the ambient air.

The system of controls described generally hereinabove will now be dealt with in greater detail with reference to the accompanying drawings wherein:

Figure 1 is a schematic illustrating the main components of a mill and airstream of the type to which the present invention applies;

Figure 1a is a schematic illustrating an appropriate venturi scrubber and separator, and showing these components from Figure 1 in greater detail.

Figure 2 is a schematic similar to that shown in Figure 1 but illustrating the application of controls suitable for the system when operated in a climate having wide temperature and humidity changes and on feed material which varies in character;

Figure 2a is a fragmentary detail from Figure 2 showing the control for the bleed-off damper;

Figure 3 is a schematic similar to Figure 2 but illustrating an appropriate arrangement of controls for operation in a very dry climate;

Figure 3a is a schematic of a preferred control system embodying air condition control based on a venturi scrubber;

Figure 4 is a schematic similar to Figures 2 and 3 but illustrating an arrangement of controls suitable for a highly uniform feed material;

Figure 5 is a schematic of a suitable system for the control of the bypass damper;

Figure 6 is a schematic of a suitable system for the control of the main fan damper;

Figure 7 is a fragmentary perspective view illustrating the duct work associated with the joint between the bypass air duct and the mill outlet air duct;

Figure 8 is a schematic view of an embodiment of the present invention as applied to an open circuit milling system.

Referring now more particularly to the drawings, it will be observed that the milling system illustrated to which the controls of the present invention are applied for purposes of illustration contains a combined dry crushing and grinding mill 11 motivated by an electric motor 12. Product is removed from the mill in a current of air and passed into a products collecting system comprising outlet duct 13, classifier 14, duct 15 and collector 16. The product passes through mill outlet duct 13 to classifier 14 which removes oversize coarse product and the air and entrained product then pass through duct 15 to cyclone type product collector 16 from which the main product $Mm$ is discharged. The air from which the product has been removed is returned through duct 17 to a main fan 18 which motivates the air in the air circuit. As illustrated, the discharge of the fan is divided into four portions, one of which is passed through the air return duct 19 into a feed chute 20 at the inlet side of the mill, another of which bypasses the mill in bypass duct 21 and is introduced to the mill discharge ducts 13 adjacent the outlet side of the mill. A certain quantity of the fan discharge is drawn off by the bleed-off fan 22 through bleed-off duct 23. As illustrated, the bleed-off duct contains a venturi scrubber shown somewhat diagrammatically at 24 which removes entrained dust from the bleed-off air and bleed-off bypass duct 25 containing the damper 26 which may be used to regulate the amount of bleed-off air withdrawn through the duct 23, in a manner which enables the volume of air passed through the venturi scrubber 24 to be kept constant regardless of the amount of air withdrawn from the main airstream through the duct 23. The venturi scrubber has means for introducing a water spray at 24L near the throat and a separator after the scrubber for disposing of the water and scrubbed dust at 24F shown in more detail in Fig. 1a. The bleed-off duct 23 is also provided with a damper 27 which may be used to control the output of the fan 22. Instead of a venturi scrubber a dust collector system may be used to clean the bleed-off air comprising bleed-off duct 23, fan 22, and multi-cyclones 24a. In this case control of the bleed-off will be accomplished by adjusting the bleed-off fan damper 27 as illustrated in Figure 2.

A further portion of the discharge of the main fan 18 is drawn off by the classifier fan 28 through duct 29 in order to feed a volume of air controlled by damper 28a through duct 30 for passage upwardly through the classifier 14.

The total output of the main fan 18 is controlled by the main fan damper 31 and the proportion of air passing through ducts 19 and 21 is controlled by the proportioning damper 32.

The coarse discharge from the classifier 14 is collected on the return oversize conveyor 33 which returns it to the inlet side of the mill through hopper 34 and feed chute 20. Alternatively the oversize may be passed to a further treatment stage or to a tailings disposal system depending upon the nature of the particular operation.

Feed material for the mill ($Mo$) is discharged into the feed chute 20 by the feed conveyor 35 which is illustrated as being a constant speed type of conveyor to which a controlled amount of feed material is supplied by feeder 36 which delivers feed from the feed storage bin 37. Alternative arrangements are well known in the art wherein a constant loading per unit length is fed by means of a variable speed conveyor.

The quantity of feed discharged on to the belt 35 by the feeder 36 is controlled by the automatic feed control 38 which is suitably of the type described and claimed in application Serial Nos. 282,505 (Patent No. 2,766,939) and 420,963 (Patent No. 2,766,940), and which is arranged to maintain a constant and predetermined charge volume within the mill by making use of sensed signals derived either from the sound or vibration produced by the mill in operation or the power consumed by the mill motor 12 or both.

In operation, the bleed-off fan 22 is arranged to withdraw sufficient air from the system to maintain the pressure within the air system within the feed chute 20 slightly below atmospheric pressure so that makeup air will enter at point 39 to compensate for the amount of air withdrawn from the system by fan 22, and dust will not be allowed to escape from the system.

As already explained generally, a function of the air system associated with the mill 11 is to first of all remove from the mill 11 material of a predetermined size-weight-surface area factor and to transport this material of desired size range from the mill to the classifier 14 and products collector 16. The controls necessary to accomplish this object under most conditions of operation are illustrated diagrammatically in Figure 2.

In Figure 2, the automatic feed control 38 which is suitably of the type described and claimed in Patents No. 2,766,939 and No. 2,766,940 receives sensed signals from mill 11 and from the mill motor 12. When the sensed signals indicate that milling conditions within the mill 11 vary from desired milling conditions as represented by a reference signal R, the automatic control 38 varies the feed rate of the feeder 36 in a continuous manner by an amount which corresponds in sense and magnitude to the amount of variation in the milling condition from the desired operating point which is represented by the reference signal R. In this manner, as described in the said prior applications, the milling conditions within the mill 11 are maintained substantially constant. The mill product is carried upwardly through duct 13 and into the classifier 14 where an oversized fraction containing substantially all of the material in the mill product which is above a predetermined selected size-weight-surface area factor is withdrawn and deposited upon the belt 33. The remaining mill product is carried through duct 15 to the main products collector 16 which consists suitably of one or more cyclone collectors where it is removed from the airstream.

The belt 33 may discharge into the hopper 34 which in turn discharges into the feed chute 20 as illustrated in the drawing, but in connection with certain operations, it may be more desirable to have the belt 33 discharge into a regrind circuit, into a tailings disposal circuit, or into a classifier which passes a portion of its discharge into the hopper 34 and the remainder to further treatment, regrind, or tailings disposal.

Regardless of the destination of the discharge from the belt 33, the operation of the velocity factor control 51 which is associated with it will be the same. The control 51 receives a sensed signal from a weightometer 52 associated with the belt 33, and from a weightometer 53 associated with the feed belt 35. As long as the signal from weightometer 52 bears a relationship to the signal from weightometer 53 which corresponds to the setting of the control 51, the control will not disturb the setting of the proportioning damper 32. If, however, the signal from the weightometer 52 increases in proportion to the signal from the weightometer 53 in a persistent manner indicating that the velocity factor of the air passing through the mill 11 is too high, the control 51 will cause the damper 32 to be moved in a direction which permits less air to be passed through duct 19 and relatively more through duct 21, thus, decreasing the velocity factor of the air passing through mill 11. If on the other hand the signal from weightometer 52 decreases in proportion to the signal from weightometer 53, the damper 32 is moved in the other direction so that relatively more air is passed through the duct 19 and the velocity factor of the air passing through the mill is increased.

The arrangement of the control 51 is such that the damper 32 will not be moved more than about 10% of the total run of adjustment in any one correction, and that sufficient delay will be provided between successive adjustments to enable the system to approach equilibrium. In this way, the adjustment of the damper 32 is carried out without causing abrupt changes in the circulation of air and the relatively long time constant of the adjustment system provides time integration and ensures that the tendency for over-correction and consequent hunting conditions is reduced to a minimum. A suitable wiring schematic for the control 51 will be described later on in the specification.

The carrying power of the air in the system illustrated in Figure 2 is controlled automatically by the automatic control 54. This control receives sensed pressure signals from the interior of the duct 15 and the interior of the duct 17. The pressure differential between the points P1 and P2 will be proportional to the mass velocity of the air delivered by the fan 18. The automatic control 54 also receives a sensed signal from the weightometer 53. The pressure differential P1—P2 represents a direct measure of the mass velocity of the air flowing through the system, and it is desired that this should bear a predetermined relationship to the amount of solids which is passed through the system. In order to achieve this, the automatic control 54 is calibrated in such a way that the main fan damper 31 will not be interfered with so long as the mass velocity of the air in the system as measured by the pressure differential P1—P2 bears a predetermined relationship to the signal from the weightometer 53. Should the value of the pressure differential decrease in relation to the signal weightometer 53, however, indicating insufficient mass velocity in the air system, the automatic control 54 will function to increase the opening of the damper 31. The arrangement is such, however, that the control cannot decrease the delivery of fan 18 below a predetermined point. A suitable wiring schematic to accomplish this purpose will be described later in the specification.

It will be observed at this point that the automatic controls 51 and 54 work in conjunction with each other to ensure that firstly a constant desired velocity factor is maintained through the mill 11 and secondly that the air within duct 13 has at least sufficient mass velocity to transport all of the product to the classifier 14. For instance, assuming that the mill is operating satisfactorily in the daytime when the air temperature is in the high eighties and at nighttime the air temperature drops to below the freezing point, this will result in the air in the system falling in temperature and therefore contracting and as the mass velocity of the air will be maintained the same by control 54 the linear velocity through the mill 11 will begin to fall. The automatic control 51 will then adjust the damper 32 so that more of the air delivered by fan 18 is passed through the duct 19 and the ideal velocity of air through the mill 11 is restored. Throughout this whole time the automatic control 54 has been maintaining the total weight of air delivered by fan 18 per unit time at a value which generally corresponds to the amount of material which must be moved through duct 13. Should the grinding characteristics of the ore change substantially so that the amount of material produced by the mill 11 is substantially increased, the automatic control 54 will increase the opening of the main fan damper 31 in order to preserve the correct ratio of mass velocity to solids carried by the system, and this will result in a correspondingly increased linear velocity of air through the ducts 19 and 21, and also through the mill 11. The increased velocity through the mill 11 will reflect in an increased signal from the weightometer 52 and the automatic control 51 will readjust the position of damper 32 in a direction where a smaller proportion of air is passed through duct 19 and the proper velocity factor is restored across mill 11.

Control of the condition of the air within the system illustrated in Figure 2 is accomplished primarily by adjustment of the bleed-off damper 27. It will be observed that in the system illustrated in Figure 2 the venturi shown in Figure 1 has been replaced by a multicyclone dust collector 24a through which the bleed-off fan 22 discharges to atmosphere.

Under normal operating conditions, the air circulating in the air system will be at a temperature which is 60–80° above the ambient temperature. This is due as explained above to the heat produced by friction in the mill charge and in the air system. Normally, there will be some moisture introduced with the feed material to the mill and some evaporation of this moisture will take place which has a cooling effect upon the air in the system. The temperature of the air recirculated through duct 19 represents under normal operating conditions an equilibrium between the heating effect mentioned above and the cooling effect of what evaporation is taking place plus radiation losses. Under these conditions, the relative humidity of the air within the system will be relatively constant. If, however, the dew point of the make-up air entering the system rises or an increased amount of moisture enters with the feed, the relative humidity of the air in the system will rise and the temperaturer of the air in the system will fall and under aggravated conditions, the air within the system can approach its dew point with very undesirable results.

Automatic controls 55 and 59 control the condition of the air within the system. Automatic control 59 controls the operation of a motor which opens and closes the bleed-off fan damper 27. This control receives a wet bulb temperature reading from a wet bulb device mounted in the exhaust stack 70 of the multi-cyclone collector 24a, and a reading of dry bulb temperature also at stack 70.

Figure 2a illustrates a suitable arrangement for obtaining a reading of wet bulb temperature. This consists suitably of a relatively small duct 70a leading into the venturi 72 which is supplied with water through the waterline 73. The thermostat 72a is mounted on the discharge side of the venturi which is open to the atmosphere as shown. In order to proportion the air suitably between exhaust stack 70 and the venturi 72, the damper 71 is mounted in the end of the exhaust stack.

Normally, the system is arranged so that under normal operating conditions a relative humidity will be maintained in the air system with the bleed-off fan damper 27 set for the minimum amount of bleed-off which will maintain a slightly negative pressure in the feed chute 20. Should the relative humidity within the system rise due either to wet ore or an increase in the dew point of the make-up air, the rise will be reflected in a decrease in the differential between dry bulb temperature $T_d$ and the wet bulb temperature $T_w$. The reduction in differential causes the control 59 to open the bleed-off fan damper 27 to bring into the system a greater relative amount of ambient make-up air and thus lower the relative humidity. The control 59 will open the damper 27 in several stages from its minimum setting, if necessary to its maximum setting, and includes a time delay feature to enable the system to approach equilibrium following each adjustment of the damper before a further correction can be made.

Should the amount of moisture entering the system be greater than can be compensated for by opening the bleed-off fan damper 27 to its maximum position, the temperature of the circulating air in duct 19 will fall because of the cooling effect of the evaporation of the moisture entering the system with the feed. The automatic control 55 controls the operation of a burner 56 which is connected with the duct 19 through bypass ducts 57 and 58. The automatic control 55 receives sensed temperature signals from the interior of the duct 19 at T1 and from the ambient air at the point T2 where make-up air enters the system. Whenever the temperature differential T1—T2 falls to less than a predetermined value, the control 55 causes operation of the burner 56 which heats the air within the air system until the temperature differential T1—T2 is that desired. The burner 56 may be any conventional type of burner using as fuel oil, powdered coal, or any other powdered or liquid fuel adapted for use in an automatically controlled burner. The burner arrangement is generally similar in nature to a conventional domestic or commercial thermostatically controlled heating system.

The automatic control 55 is arranged to limit the burner output to a predetermined temperature T1, inasmuch as there will be a maximum permissible operating temperature dictated by mechanical considerations and also because under conditions of drastic moisture introduction the relatively high radiation losses from the duct work of the system make the introduction of further heat uneconomical compared to pre-drying of the feed itself. It will be observed that the automatic controls 55 and 59 work in conjunction with the automatic controls 51 and 54 as the latter two controls will maintain the velocity factor and the carrying power of the air within the system at the required values regardless of the changes in bleed-off and temperature wrought by controls 55 and 59.

The arrangement of controls illustrated by the schematic shown in Figure 3 is suitable for operation in very dry climates such as that prevailing in certain regions on the African plateau. In these regions the ore bodies are large and the feed material for the mill will generally be sufficiently uniform that grindability of the ore will not vary enough to make necessary the taking into account of the variations in grindability in the operations of the various controls. As illustrated in Figure 3, the automatic control 60 receives a sensed signal from the weightometer 52. As the ore is uniform, with constant velocity across the mill 11 the return of oversize material on belt 33 will be substantially constant as will be the total amount of solids transported through the duct 13. A change in value of the signal from the weightometer 52 will therefore represent a change in the velocity factor of the air passing through mill 11. The automatic control 60 will be adjusted to maintain a fixed rate of oversize return on the belt 33 and adjustments to the position of the damper 32 will take place whenever the amount of oversize on the belt 33 is persistently above or below the value at which the control is set. Apart from the fact that there is no provision for the use of a sensed signal from a weightometer on the feed belt 35, the control 60 is in all respects similar to the control 51 illustrated in Figure 2.

Control of carrying power is in this instance accomplished by the automatic control 61 which is in all respects similar to the automatic control 54 illustrated in Figure 2 with the exception that inasmuch as the ore being treated is uniform no provision need be made for the acceptance of a signal from a weightometer on the feed belt 35, and the control 61 therefore merely functions to maintain a constant predetermined mass velocity of the total air circulated through the system.

As the air is persistently very dry there is in general no need to control its condition from the humidity point of view, although in order to provide for operation during the rainy season a burner and automatic control such as that illustrated in Figure 2 may also be provided in association with the system illustrated in Figure 3. The principal problem requiring control in the system illustrated in Figure 3 is dust saturation. As is well known the efficiency of cyclone collectors falls off markedly when the humidity of the air is very low. Where there is a substantial amount of extreme fines produced in the reduction operation, this falling off in efficiency of the cyclones can cause the dust load in the return air duct to become greater than can be accepted both from the point of view of wear on the blades of the main fan 18 as well as from the point of view of a resultant loss in the net carrying power of the air which is circulated. The ambient relative humidity at which the efficiency of the cyclones in any system falls below a point which corresponds with the maximum permissible dust load in the return air circuit will be readily ascertainable in any particular operation, and the automatic control 62 which receives a sensed relative humidity signal (by means of a relative humidity detecting device incorporated within the control box and adapted to react to changes in humidity of the ambient air) can be made to commence closing the bleed-off damper 26 to increase the bleed-off through duct 23 whenever the humidity H approaches the value which leads to increased dust loading in the system. Instead of using a sensed relative humidity signal which only indirectly indicates humidity conditions within the duct 19 a sensed signal proportional to the dust concentration inside the duct may be derived with the use of a smoke density indicator employing a photo-electric cell and light source arranged to transmit light to the cell either across the duct 19 or across a portion of it. Alternatively, the automatic control 62 may be used to control the operation of a water valve 64 in a water-line which is connected to a spray-head 65 which will introduce moisture into the duct 15 in advance of the cyclone 16 to raise the humidity of the air passing into the cyclone 16 and thus raise the efficiency of the cyclone to reduce the dust load in the return air ducts, or a system such as that illustrated in Figure 3a may be used, wherein the relative humidity of the system is controlled by bleed-in of saturated air from the venturi scrubber 24.

In Figure 4, the control system illustrated is particularly adapted for use in temperate climates where the material being treated by the mill is relatively uniform. In this instance, the controls 66 and 67 are identical with the controls 60 and 61 illustrated in Figure 3, and the control 68 is identical with the control 55 illustrated in Figure 2. It will be appreciated from what has already been said concerning the function of these controls that with a relatively uniform feed material these three controls connected as illustrated will effectively maintain the velocity factor carrying power and condition of the air at consistent values that will enable full use to be made of the reduction capacity of the mill.

In Figures 2 and 4, the burner 56 has been illustrated as connecting with the air return duct 19. It will be appreciated that the burner may be situated in the bypass duct 21 if desired, and in some cases there may be an advantage in doing this. For instance, if a coarse grind is being produced in the mill 11, and the ore or other material being reduced is cold, introducing the necessary heat in the bypass duct 21 rather than in the air return duct 19 will result in the cold material being in contact with the hottest portions of the airstream for a much shorter period than would be the case if the burner were situated in the air return duct 19. In this instance, the coarser particles of product will be carried to the classifier 14 and will be withdrawn from the airstream before they have been heated through and a saving can therefore be effected in the sensible heat which would be lost in the product if these larger particles were heated completely through. In general, however, it is preferred to heat the air in the return duct 19 as this enables a greater amount of moisture to be evaporated in the feed chute 20 and the mill 11 and therefore tends to give a greater moisture toleration to the system than would be the case with the burner in any other position.

A system which is adapted to maintain the condition of the air under practically any conditions of operation is illustrated in Figure 3a in association with a system adapted to operate on ore which is relatively uniform as to grindability.

In the arrangement shown in Figure 3a, the venturi scrubber 24 is used as a wet bulb device to indicate roughly the dew point of the air leaving the air system. The bleed-off bypass damper 26 is operated by a thermostat temperature controller 80 which operates the damper 26 to maintain a constant dry-bulb temperature in the system.

The wet bulb temperature or dew point is controlled by thermostat 80a which is located on the saturated side of the venturi scrubber 24. This thermostat 80a controls the amount of saturated air bled back into the system from the output side of the venturi scrubber 24 through the duct 82, by opening and closing the damper 81 through motor damper control 81a. In this manner, the dew point of the system is maintained substantially constant at a predetermined value.

In order to provide against excess bleed-in through duct 82 causing a blowout from the system at the feed chute opening, the air flow actuated switch 84 which operates the relay 85 is arranged to open the circuit of damper control 81a to prevent further opening of the damper 81 when the indicated air flow into the system at the feed chute opening arrives at a predetermined minimum value.

In the system illustrated in Figure 3a, the heater 56 is controlled on the basis of the wet bulb-dry bulb temperature differential as measured by differential thermostat 80b. If this differential becomes too low due to an increase in humidity within the system which it is beyond the capacity of the thermostats 80 and 80a to correct by adjustment of the dampers 81 and 26, the differential will persistently fall below the value which the differential thermostat 80b is set to maintain in the system. When this occurs, the differential thermostat 80b will cause operation of the burner 56 until the required wet bulb-dry bulb temperature differential in the system is restored.

Also associated with the burner 56 is the thermostat 56a which limits the burner output whenever the air in the return air duct 19 reaches its maximum permissible value.

It will be observed that the air conditioning control described above will maintain any desired relative humidity within the air system. In operation, the thermostat 80 will be set to maintain a particular operating temperature which experience has shown is suited to the conditions of operation. If desired, this thermostat may be a differential thermostat which operates on the basis of difference between the ambient temperature and the temperature of the air within the duct. For example, under normal temperate conditions, the operating temperature will suitably be in the region of 140° F. Assuming that it is desired to maintain a relative humidity in the system of about 50% (which would reflect a dry bulb-wet bulb temperature difference of approximately 25° at the dry bulb temperatures under consideration) the thermostat 80a will be set to maintain a wet bulb temperature in the venturi outlet which is 25° below the temperature set on the thermostat 80. If, for instance, the thermostat 80 is set to maintain a dry bulb temperature of 140° F., the thermostat 80a would be set to maintain a wet bulb temperature of 115° F. If the thermostat 80 is a differential thermostat, the thermostat 80a should also be a differential thermostat, and the same considerations will apply to the relative settings.

If more moisture enters the system in the feed material than can be compensated for by adjustment of the dampers 81 and 26, the thermostats controlling these dampers will be unable to hold the system at the wet and dry bulb temperatures selected. Under these conditions, the wet bulb-dry bulb temperature differential will decrease and at a predetermined temperature differential which may correspond to a desired relative humidity within the system, the burner 56 will be placed in operation until the selected relative humidity has been restored. Normally speaking if the thermostats 80 and 80a have been set 25° F. apart, it will be appropriate to have the burner commence operation when the wet bulb-dry bulb differential falls below about 20°. It is desirable that there should be some difference between the relative humidity that will be maintained by the thermostats 80 and 80a and that which will be maintained by the burner 56 in order to prevent operation of the burner from being initiated casually during periods of adjustment of the dampers 27 and 81.

Earlier in the specification, mention was made of damper adjusting means having time delay features. Figures 5 and 6 illustrate schematically suitable systems for operating the dampers associated with the control systems used in the present invention the figures relating respectively to the control of dampers 32 and 31.

Referring to Figure 5, the damper 32 is motivated by the motor 90 which is of the split field type and which has the forward field winding 91 and the reverse field winding 92 which are respectively connected to the time delay relays 93 and 94. To operate motor 90—91, 115 volt, 60 cycle power is applied to terminals 91a via conventional connecting means not shown. Likewise, 115 volt, 60 cycle power is applied to each of the terminals 93a and 94a of time delay relays 93 and 94. The time delay relays 93 and 94 are connected to contacts E and F of the toggle contactor 95, which is actuated by the coils 96 and 97, and the toggle 95 will establish contact between the contact sets E or F depending upon whether the E.M.F. is greater in coil 96 or in 97. Applied across the coil 96 is a master signal which is derived by a weight and belt speed integrating device which produces as a master signal a voltage which is proportional to the rate of feed of material to the mill. This signal is fed to a potentiometer 98, one side of which is grounded and the voltage applied across coil 96 is thus a predetermined proportion of the total master signal. The slave signal is generated in the same way, as a voltage proportional to the amount of material conveyed on the return oversize conveyor and the setting of potentiometer 99 determines the proportion of the total slave signal which is applied to the coil 97. A third potentiometer 100 is provided with its centre point grounded and is used for purposes of establishing a suitable balance point for the system. In operation, it will be evident that the system just described will cause operation of the motor 90 to open or close the damper 32 to increase or decrease the amount of air passing through the return air duct 19 in accordance with whether the slave signal applied to coil 97 is larger or smaller than the master signal applied to the coil 96.

In the system shown in Figure 6, the principle of operation is similar with the exception that the slave signal responds to an air pressure differential between different parts of the air system. Furthermore, the master signal consists of two parts (a) A fixed minimum voltage which is applied across potentiometer 101 and (b) A variable weight responsive portion which is applied across potentiometer 102.

The setting of potentiometer 101 determines the minimum value of the master signal and will normally be set to correspond to a mass velocity of air in the system which will maintain the correct velocity factor across the mill with the damper 32 completely closing off the bypass duct 21. The potentiometer 102 determines the amount by which the mass velocity of the air in the system is to be increased for a given increase in the rate of feed to the mill. It may be desirable to include in the system a balancing potentiometer similar to the potentiometer 100 of Figure 5. It will be evident that the system illustrated in Figure 6 will operate to increase or decrease the amount of air passed through the duct 17 to make the mass velocity correspond in value to the sum of the fixed and variable proportions of the master signal so that the mass velocity will increase to compensate for any increase in the amount of material fed to the mill but will not be reduced below a value which corresponds to the correct velocity factor across the mill 11 when the bypass duct 21 is carrying no air at all.

Figure 7 shows a detail of the joint between the bypass duct 21 and the mill outlet duct 13, which joint is adapted in accordance with the invention to introduce the bypass air in rapidly moving streams passing up the outlet duct 13 from a point adjacent the mill outlet. As will be observed, the air in duct 21 is distributed between the three ducts 105, 106 and 107, the former two of which are connected with the sides of the mill outlet duct 13 and the latter of which opens into the bottom of the outlet duct 13. Each of the ducts 105, 106 and 107 is of decreasing cross section, their point of minimum cross section being their point of juncture with the mill outlet duct 13. The total cross section of the three ducts at their point of entry into the bypass duct 13 is so calculated that the velocity of the air introduced to the mill outlet duct 13 will be substantially higher and preferably at least 1½ times as great as the velocity of the air passing through the mill outlet duct immediately upstream of the joint.

Because certain material may casually find its way into the duct 107, this is provided with a small hopper type collector 108 which can be opened and emptied at periodic intervals.

Figure 8 shows a control system according to the invention similar to that illustrated in Figure 4 but wherein the circuit has an open circuit. It will be observed that the main components of the system are identical with those in Figure 4 and are given the same reference numerals, the only difference being that the return air duct is replaced by the air inlet duct 110 and the bypass duct has its function fulfilled by the control damper 111 (controlled by box 66) controlling the entry of air to the mill outlet duct 13 through a joint similar to that shown in Figure 7. Control box 67a is used similarly as box 67 of Fig. 4, except that since an open circuit is used, the box is used to control damper 26 of duct 25.

Although it is generally less economical to operate in open circuit than in closed circuit because of the fixed 100% "bleed-off"; there are occasions in certain areas where persistently high relative humidity and persistently high temperatures make this sort of operation desirable. Also in cases where noxious gases or solids are released during the reduction process, it may be necessary to operate in open circuit to avoid the buildup of noxious substances in the system, and in and around the mill building.

What we claim as our invention is:

1. The method of controlling the operation of a dry material reduction mill of the rotating drum type wherein product is removed from the mill and transported by means of air circulated through the drum and an associated air circuit, which method comprises; supplying feed material to said mill at a rate which is varied automatically in a continuous manner to control the conditions of reduction within said mill in accordance with the product desired; maintaining the velocity factor of air passing through said drum at a substantially constant predetermined value; continuously maintaining the carrying power of air within the air circuit on the downstream side of the mill at a value which is at least high enough to transport all of the mill product of less than a predetermined size-weight-surface area factor; and continuously maintaining the condition of the airstream within said air circuit compatible with the maintenance of efficient operating conditions within said mill drum and air circuit.

2. The method of controlling the operation of a dry material reduction mill of the rotating drum type wherein product is removed from the mill and transported by means of air circulated through the drum and an associated air circuit, which method comprises; supplying feed material to said mill at a rate which is varied automatically in a continuous manner to control the conditions of reduction within said mill in accordance with the product desired; maintaining the velocity factor of air passing through said drum at a substantially constant predetermined value; continuously maintaining the carrying power of air within the air circuit on the downstream side of the mill at a value which is at least high enough to transport all of the mill product of less than a predetermined size-weight-surface area factor; and continuously maintaining the relative humidity of the air in the air circuit within a predetermined range of relative humidities compatible with the maintenance of efficient operating conditions within said mill drum and air circuit.

3. The method of controlling the operation of a dry material reduction mill of the rotating drum type wherein product is removed from the mill and transported by means of air circulated through the drum and an associated air circuit, which method comprises; supplying feed material to said mill at a rate which is varied automatically in a continuous manner to control the conditions of reduction within said mill in accordance with the product desired; maintaining the velocity factor of air passing through said drum at a substantially constant predetermined value; continuously maintaining the carrying power of air within the air circuit on the downstream side of the mill at a value which is at least high enough to transport all of the mill product of less than a predetermined size-weight-surface area factor; withdrawing air from said circuit in controlled amounts and replacing it with ambient air to continuously maintain the relative humidity within the air circuit within a predetermined range compatible with the maintenance of efficient operating conditions within said mill drum and air circuit.

4. The method of controlling the operation of a dry material reduction mill of the rotating drum type wherein product is removed from the mill and transported by means of air circulated through the drum and an associated air circuit, which method comprises; supplying feed material to said mill at a rate which is varied automatically in a continuous manner to control the conditions of reduction within said mill in accordance with the product desired; maintaining the velocity factor of air passing through said drum at a substantially constant predetermined value; continuously maintaining the carrying power of air within the air circuit on the downstream side of the mill at a value which is at least high enough to transport all of the mill product of less than a predetermined size-weight-surface area factor; measuring the difference between the wet and dry bulb temperatures of air leaving the air circuit; and adjusting the bleed-off ratio of air from said system and the temperature of the air in said system to maintain a wet-bulb, dry-bulb temperature differential in the air leaving the circuit which corresponds with a predetermined range of relative humidity compatible with the maintenance of efficient operating conditions within said mill drum and air circuit.

5. The method of controlling the operation of a dry material reduction mill of the rotating drum type wherein product is removed from the mill and transported by means of air circulated through the drum and an associated air circuit, which method comprises; supplying feed material to said mill at a rate which is varied automatically in a continuous manner to control the conditions of reduction within said mill in accordance with the product desired; maintaining the velocity factor of air passing through said drum at a substantially constant predetermined value; continuously maintaining the carrying power of air within the air circuit on the downstream side of the mill at a value which is at least high enough to transport all of the mill product of less than a predetermined size-weight-surface area factor; and adjusting the bleed-off ratio of air from said system and the temperature of the air in said system to maintain a predetermined range of relative humidity thereof compatible with the maintenance of efficient operating conditions within said mill drum and air circuit.

6. The method of controlling the operation of a dry material reduction mill of the rotating drum type wherein product is removed from the mill and transported by means of air circulated through the drum and an associated air circuit, which method comprises; supplying feed material to said mill at a rate which is varied automatically in a continuous manner to control the conditions of reduction within said mill in accordance with the product desired; maintaining the velocity factor of air passing through said drum at a substantially constant predetermined value; continuously maintaining the carrying power of air within the air circuit on the downstream side of the mill at a value which is at least high enough to transport all of the mill product of less than a predetermined size-weight-surface area factor; and continuously maintaining the temperature of the airstream within said air circuit at a substantially higher value than the temperature of the ambient air, compatible with the maintenance of efficient operating conditions within said mill drum and air circuit.

7. A method of operating a dry material reduction mill of the type wherein air circulated through said mill and an air system associated therewith is used as the product extracting medium, comprising; supplying feed material to said mill at a rate which is varied automatically in a continuous manner to maintain substantially constant conditions of reduction within said mill; continuously entraining and carrying away from said mill in an airstream material of a selected size-weight-surface area factor range determined by the velocity of the air passing through the mill; removing from said airstream an oversize fraction of said material; continuously measuring the rate of production of said oversize material; continuously comparing said rate of production of said oversize with a predetermined value of said rate established as an ideal operating point; and adjusting the velocity of the air passing through the mill in accordance with whether said rate is greater or smaller than said predetermined value to maintain the production of said oversize fraction at substantially said predetermined rate.

8. A method as defined in claim 7 wherein the predetermined value of said rate established as an ideal operating point is a fixed proportion of the rate of feed of feed material to said mill.

9. A method as defined in claim 8 wherein the mass velocity of air in said air system available for transporting material from the mill to a point of removal of said oversize fraction is maintained in fixed proportion to the rate of feed of feed material to the mill.

10. A method as defined in claim 9 wherein a first amount of air sufficient to maintain the required velocity of air through the mill is passed through the mill, and a second amount of air sufficient when combined with said first amount to transport the material of a selected size range removed from the mill to a point of removal of said oversize fraction is introduced to the airstream in which said material is removed from the mill, adjacent the downstream side of the mill.

11. A method as defined in claim 10 wherein the second amount of air is added in the form of streams one of which enters adjacent the underside at least of said airstream and moving essentially in the direction of flow of said airstream at a velocity which is substantially higher than the average velocity of air within said airstream.

12. A method as defined in claim 7 wherein the mass velocity of air in said system available for transporting material from the mill to a point of removal of said oversize fraction is maintained substantially constant.

13. A method as defined in claim 12 wherein a first amount of air sufficient to maintain the required velocity of air through the mill is passed through the mill, and a second amount of air sufficient when combined with said first amount to transport the material of a selected size range removed from the mill to a point of removal of said oversize fraction is introduced to the airstream in which said material is removed from the mill, adjacent the downstream side of the mill.

14. A method as defined in claim 13 wherein the second amount of air is added in the form of at least one stream adjacent at least the lower side of said airstream and moving essentially in the direction of flow of said airstream at a velocity which is substantially higher than the average velocity of air within said airstream.

15. An air system for a dry material reduction mill, said system comprising; an outlet duct for said mill; a products collection system connected with said outlet duct; a fan inlet duct leading from said products collection system; a main fan means in said fan inlet duct; a return air duct leading from said main fan means to the inlet side of said mill; a by-pass air duct leading from said return air duct adjacent said main fan means to said outlet duct adjacent the outlet side of said mill; a bleed-off duct leading from said return air duct adjacent said main fan means; bleed-off fan means and dust collection means connected to said bleed-off duct; bleed-off damper means arranged to control the amount of air passed through said bleed-off duct; main damper means arranged to control the amount of air delivered by said main fan means; and by-pass damper means arranged to control the relative amounts of air passing through said return air duct and said by-pass duct.

16. An air system as defined in claim 15 wherein said by-pass duct and said mill outlet duct communicate through a joint which is arranged to introduce by-pass air into said mill outlet duct in at least one stream of substantially higher velocity than the velocity of the air in said mill outlet duct upstream of said joint.

17. An air system as defined in claim 16 wherein said joint consists of at least one joint duct of convergent cross-section arranged to direct a stream of high velocity air into said mill outlet duct substantially longitudinally thereof towards said products collection system.

18. An air system as defined in claim 17 comprising three said joint ducts, one of which communicates with the underneath of said mill outlet duct, and the other two of which communicate with the sides of said mill outlet duct.

19. An air system as defined in claim 15 wherein the dust collection system comprises a venturi-scrubber in said bleed-off duct between the bleed-off fan and the return air duct.

20. An air system as defined in claim 19 and comprising; a bleed-in duct establishing communication between the output side of the bleed-off fan and the interior of the air return duct; and a damper arranged to control the flow of air through said bleed-in duct.

21. An air system as defined in claim 19 comprising automatic control means for the bleed-off damper, said control means comprising; first temperature sensing means arranged to sense the temperature within the main fan inlet duct; power adjustment means for said bypass damper; and control means for said power adjustment means arranged to cause operation of said power adjustment means to adjust the position of the by-pass damper responsively to the temperature within the main fan inlet duct to increase the bleed-off air for persistent rises in said temperature and vice versa.

22. An air system as defined in claim 21 comprising a bleed-in duct establishing communication between the output side of the bleed-off fan and the interior of the return air duct; a damper arranged to control the flow of air through said bleed-in duct; power actuating means for said bleed-in damper; temperature sensing means arranged to sense the temperature on the outlet side of the venturi scrubber and control means for said power actuating means arranged to increase the amount of bleed-in air for persistent increase in said temperature from a predetermined value and vice versa.

23. An air system as defined in claim 21 comprising; heater means arranged to heat the air in said system; actuating means for said heater; control means for said actuating means arranged to cause actuation of said actuating means in response to any persistent decrease in the value of a sensed temperature difference between the outlet of the venturi and the main fan inlet duct below a predetermined value; and cut-off means for said heater arranged to cut-off operation thereof when the temperature of the air within the circuit reaches a predetermined value.

24. An air system as defined in claim 15 wherein said products collection system comprises an air classifier in series with a cyclone collector.

25. An air system as defined in claim 24 comprising air supply means for said classifier, said air supply means comprising; classifier supply duct means communicating with said return air duct adjacent the main fan means; classifier fan means in said classifier supply duct means; and damper means arranged to control the quantity of air delivered to said classifier through said classifier duct means.

26. An air system as defined in claim 25 wherein the air heating means is positioned in the return air duct.

27. An air system as defined in claim 15 and comprising air heater means arranged to heat the air in said system.

28. An air system as defined in claim 15 comprising means for maintaining a substantially constant delivery from said main fan, said means comprising; a differential pressure sensing device connected across at least a portion of the products collection system; means for establishing a reference point for said differential pressure sensing device corresponding to a desired output for said fan; and means for adjusting the main fan damper in response to variations in the pressure differential sensed by said pressure differential sensing device from said reference point to maintain the delivery of said fan at a value which corresponds to said reference point.

29. An air system as defined in claim 28 wherein said means for establishing a reference point is manually adjustable.

30. An air system as defined in claim 29 wherein the means for establishing a reference point comprises means for producing an electrical signal responsive to the rate of delivery of feed material to the mill, and means for adjusting said reference point upwardly responsively to persistent variations in the magnitude of said electrical signal, whereby the amount of air delivered by said fan increases in proportion to any increase in the average rate of feed to the mill over a predetermined time interval, but remains at the manually set value of said reference point during any decreases in the rate of production of the mill.

31. An air system as defined in claim 15 comprising automatic means for adjusting the by-pass damper to maintain the velocity of the airstream passing through said mill substantially constant at a predetermined value.

32. An air system as defined in claim 31 wherein said automatic means comprises means for evaluating the velocity of the air passing through the mill; means for establishing a reference point corresponding to a desired evaluated velocity; power operating means for said by-pass damper means; an automatic control means for said power operating means arranged to cause adjustment of the position of said by-pass damper in response to a persistent difference between the value of the evaluated velocity and the established reference point in a direction which tends to reduce said persistent difference.

33. An air system as defined in claim 32 wherein the products collection system includes a classifier arranged to withdraw an oversize fraction from the airstream, and in which the means for evaluating the velocity of the air passing through the mill comprises: a belt upon which said oversize fraction is transported; means for weighing the material thus transported; and means for producing an electrical signal which is proportional to the rate of transport of said material, the said rate representing the velocity of the air through the mill.

34. An air system as defined in claim 32 wherein the means for establishing a reference point corresponding to a desired evaluated velocity comprises means for producing an electrical signal proportional to the rate of feed of feed material to the mill; means for manually adjusting the value of said reference point; and means for automatically increasing or decreasing the value of said reference point in response to persistent changes in the value of said electrical signal, whereby said reference point corresponds to an integrated value of a fixed proportion of the feed rate to the mill determined by the manual adjustment of said reference point.

35. Apparatus for the reduction of material in the substantially dry state, said apparatus comprising; a dry material reduction mill; means for feeding material to said mill for reduction therein; automatic control means for said feeding means arranged to vary the rate of feed to said mill in a continuous manner to maintain substantially constant reduction conditions therein; an air circuit associated with said mill, said air circuit including a main fan means, a mill outlet duct, and a products collection system connected in series between said mill and said fan, an air return duct leading from said fan to the inlet side of said mill, a bypass duct leading from the output side of said fan to said mill outlet duct adjacent said mill, bleed-off means including a bleed-off duct, a bleed-off fan and a dust collection system leading from the outlet side of said main fan, and damper means arranged to control the amount of air passed by said main fan, the relative amounts of air passed through said by-pass and said return air ducts, and the amount of air passed through said bleed-off means; a first automatic damper control means arranged to adjust the position of the damper which controls the relative amounts of air passed through said by-pass and said return air duct to maintain the velocity of air passing through the mill substantially constant; a second automatic damper control means arranged to adjust the damper controlling the amount of air passed by the main fan to maintain a predetermined carrying power of the air passed thereby; and air conditioning means arranged to maintain a predetermined range of relative humidity of the air within said air circuit compatible with efficient operation of said mill and said air circuit.

References Cited in the file of this patent

UNITED STATES PATENTS

| | | |
|---|---|---|
| Re. 20,156 | Hardgrove | Nov. 3, 1936 |
| 710,604 | Osborne et al. | Oct. 7, 1902 |
| 1,430,853 | Roesch | Oct. 3, 1922 |
| 1,802,252 | Harvey | Apr. 21, 1931 |
| 2,291,618 | Frisch | Aug. 4, 1942 |
| 2,587,020 | Wicker et al. | Feb. 26, 1952 |
| 2,662,694 | Lotz | Dec. 15, 1953 |
| 2,783,947 | Hage | Mar. 5, 1957 |